(12) United States Patent
Boshart

(10) Patent No.: US 8,789,360 B2
(45) Date of Patent: Jul. 29, 2014

(54) OVER TEMPERATURE/PRESSURE SAFETY DEVICE FOR DIESEL PARTICULATE FILTERS

(71) Applicant: Boshart Automotive Testing Services, Inc., Ontario, CA (US)

(72) Inventor: Kenneth J. Boshart, Rialto, CA (US)

(73) Assignee: Boshart Automotive Testing Services, Inc., Ontario (CA)

( * ) Notice: Subject to any disclaimer, the term of this patent is extended or adjusted under 35 U.S.C. 154(b) by 0 days.

(21) Appl. No.: 13/659,823

(22) Filed: Oct. 24, 2012

(65) Prior Publication Data

US 2013/0111879 A1    May 9, 2013

Related U.S. Application Data

(60) Provisional application No. 61/594,158, filed on Feb. 2, 2012, provisional application No. 61/551,794, filed on Oct. 26, 2011.

(51) Int. Cl.
*F01N 3/00* (2006.01)
*F16K 17/14* (2006.01)

(52) U.S. Cl.
USPC ............ 60/288; 60/287; 60/295; 60/286; 137/67

(58) Field of Classification Search
CPC ............................... F01N 3/031; F01N 11/00
USPC .................................. 60/272–324; 137/67
See application file for complete search history.

(56) References Cited

U.S. PATENT DOCUMENTS

| | | | | | |
|---|---|---|---|---|---|
| 1,695,554 | A | * | 12/1928 | Markels | 96/113 |
| 4,319,453 | A | * | 3/1982 | Mann | 60/309 |
| 4,485,622 | A | * | 12/1984 | Takagi et al. | 60/296 |
| 4,505,106 | A | * | 3/1985 | Frankenberg et al. | 60/286 |
| 4,795,051 | A | * | 1/1989 | Ou | 220/89.2 |
| 4,987,738 | A | * | 1/1991 | Lopez-Crevillen et al. | 60/286 |
| 5,063,737 | A | * | 11/1991 | Lopez-Crevillen et al. | 60/286 |
| 5,251,564 | A | * | 10/1993 | Rim et al. | 110/344 |
| 5,489,319 | A | | 2/1996 | Tokuda et al. | |
| 5,577,479 | A | | 11/1996 | Popp | |
| 5,582,002 | A | | 12/1996 | Pattas | |
| 5,595,580 | A | * | 1/1997 | Kawamura | 55/288 |
| 5,631,634 | A | | 5/1997 | Strelow | |
| 5,921,079 | A | * | 7/1999 | Harris | 60/288 |

(Continued)

FOREIGN PATENT DOCUMENTS

EP       0 194 131     5/1992
WO   WO 2011/110920   9/2011

OTHER PUBLICATIONS

International Search Report; PCT/US2012/061720; Mailing Date: Jan. 24, 2013; 22 Pages.

*Primary Examiner* — Thomas Denion
*Assistant Examiner* — Anthony Ayala Delgado
(74) *Attorney, Agent, or Firm* — Knobbe Martens Olson & Bear, LLP

(57) ABSTRACT

A safety device for an exhaust gas aftertreatment system provides an alternative exhaust route in case of high temperatures or pressures within the regenerating particulate filter of the exhaust gas aftertreatment system that may cause damage to the particulate filter. The safety device comprises a valve that redirects the flow of exhaust gas from the regenerating particulate filter when specified temperature or pressure thresholds are met or exceeded.

19 Claims, 11 Drawing Sheets

(56) References Cited

U.S. PATENT DOCUMENTS

| | | |
|---|---|---|
| 6,708,486 B2 * | 3/2004 | Hirota et al. .................. 60/297 |
| 6,748,743 B1 | 6/2004 | Foster-Pegg |
| 6,756,904 B2 | 6/2004 | Kinugawa et al. |
| 7,159,384 B2 | 1/2007 | Otake et al. |
| 7,337,609 B2 | 3/2008 | Mahnken et al. |
| 7,421,839 B2 * | 9/2008 | Igarashi ...................... 60/297 |
| 7,716,922 B2 | 5/2010 | Ehlers |
| 7,891,176 B2 | 2/2011 | Konstandopoulos |
| 7,987,662 B2 | 8/2011 | Ruona |
| 8,195,354 B2 | 6/2012 | Kariya et al. |
| 2007/0074508 A1 * | 4/2007 | Tomlins et al. ................ 60/297 |
| 2008/0155968 A1 | 7/2008 | Salemme et al. |
| 2009/0120070 A1 * | 5/2009 | Hirata et al. .................. 60/286 |
| 2009/0288398 A1 | 11/2009 | Perfetto et al. |
| 2010/0247980 A1 | 9/2010 | Jang et al. |
| 2010/0319319 A1 * | 12/2010 | Ide .............................. 60/277 |
| 2011/0005205 A1 * | 1/2011 | Lee et al. ..................... 60/277 |
| 2011/0252765 A1 | 10/2011 | Makartchouk et al. |
| 2011/0315132 A1 | 12/2011 | Petersen |
| 2012/0110983 A1 | 5/2012 | Griffith |

* cited by examiner

OVER TEMPERATURE/PRESSURE SAFETY DEVICE FOR DIESEL PARTICULATE FILTERS

CROSS-REFERENCE TO RELATED APPLICATIONS

This application claims the benefit under 35 U.S.C. §119 (e) of U.S. Provisional Patent Application No. 61/551,794, filed on Oct. 26, 2011, and U.S. Provisional Patent Application No. 61/594,158, filed on Feb. 2, 2012, which are hereby incorporated by reference in their entirety.

BACKGROUND OF THE INVENTION

1. Field of the Invention

The present invention generally relates to exhaust gas aftertreatment devices and more particularly to safety devices and systems for exhaust gas aftertreatment devices.

2. Description of the Related Art

A diesel engine uses the heat of compression to initiate ignition to burn the fuel injected into the combustion chamber. This process typically results in imperfect combustion due to the non-uniform distribution of fuel and air during combustion. As a result, noxious particulates are generated. These particulates are mainly particulate matter (PM or soot), unburned hydrocarbons, and sulfur oxides.

Many diesel engines therefore are equipped with particulate reduction systems to reduce the amount of particulates released to the atmosphere. These particulate reduction systems may take the form of passive-regeneration systems that trap particulates with a catalytic filter. The systems with filters catalytically oxidize the trapped particulates at a given temperature or higher.

However, such passive regeneration systems may encounter an abnormal condition as a result of the engine being operated beyond the time frame within which the filter should have been regenerated. These abnormal conditions may lead to an over temperature or over pressure condition in the filter, which may result in damage to the filter and/or the engine.

Other particulate reduction systems may take the form of active-regeneration filter systems that trap particulates without the use of a catalyst. These active-regeneration filters use an external source of heat to initiate the filter regeneration.

SUMMARY OF THE INVENTION

Thus, a device, system and/or method that can be used to protect at least one of the engine and the filter in such situations is desired. In some configurations, a safety device, system, and/or method for reducing the likelihood of over temperature or pressure conditions within a diesel particulate filter are desired. In some configurations, the safety device desirably reduces the likelihood of diesel particulate filters (DPFs) from reaching a condition where the filter has become overloaded to the point that the particulate accumulated within the filter presents a potential over temperature condition that could damage the integrity of the substrate of the filter and the filter housing.

In some configurations, a safety device for an exhaust gas aftertreatment system comprises a valve, a pressure relief device, and a controller. The valve is located upstream of a first diesel particulate filter and a second diesel particulate filter. The pressure relief device is located upstream of the second diesel particulate filter. The controller is configured to control an actuator which operates the valve between an open state and a closed state when the system detects one or more of a predetermined temperature condition and a predetermined pressure condition within the first diesel particulate filter.

In some configurations, a safety device for an exhaust gas aftertreatment system comprises a body containing a diesel particulate filter, an exhaust gas inlet tube connected to an exhaust pipe, an exhaust gas outlet tube connected to a second end of the body, a rupture disk, and a valve. The exhaust gas inlet tube is connected to a first end of the body and is adapted to introduce exhaust gas to the diesel particulate filter. The exhaust gas outlet tube is connected to a second end of the body and is adapted to emit treated exhaust gas. The rupture disk is located within the exhaust gas inlet tube upstream of the diesel particulate filter. The valve is located within the exhaust pipe upstream of the exhaust gas inlet tube such that the valve can redirect exhaust gas into the exhaust gas inlet tube.

In some configurations, an exhaust gas aftertreatment device comprises a first diesel particulate filter, a second diesel particulate filter, a valve, and a control means for controlling operation of the valve. The first diesel particulate filter has a first exhaust gas inlet connected to an exhaust pipe configured to introduce exhaust gas into the first diesel particulate filter and a first exhaust gas outlet for emitting treated exhaust gas. The second diesel particulate filter has a second exhaust gas inlet connected to an exhaust pipe to introduce exhaust gas into the second diesel particulate filter and a second exhaust gas outlet for emitting treated exhaust gas. The second exhaust gas inlet further comprises a pressure relief device upstream of the second diesel particulate filter. The valve is located within the exhaust pipe upstream of the first diesel particulate filter and is controlled by a control means.

In some configurations, a method for controlling an exhaust gas aftertreatment system comprises the steps of determining whether a maximum safe level of particulate loading on a particulate filter of the exhaust gas aftertreatment system has been reached; determining whether a pre-set time limit has been reached; activating a safety device configured to redirect a flow exhaust gas from the particulate filter of the exhaust gas aftertreatment system if the maximum safe level of particulate loading has been reached; and activating the safety device configured to redirect the flow of exhaust gas from the particulate filter of the exhaust gas aftertreatment system if the pre-set time limit has been reached.

BRIEF DESCRIPTION OF THE DRAWINGS

These and other features, aspects and advantages of certain embodiments of the present invention will be described with reference to the following drawings.

DETAILED DESCRIPTION OF THE PREFERRED EMBODIMENT

Figure 1:
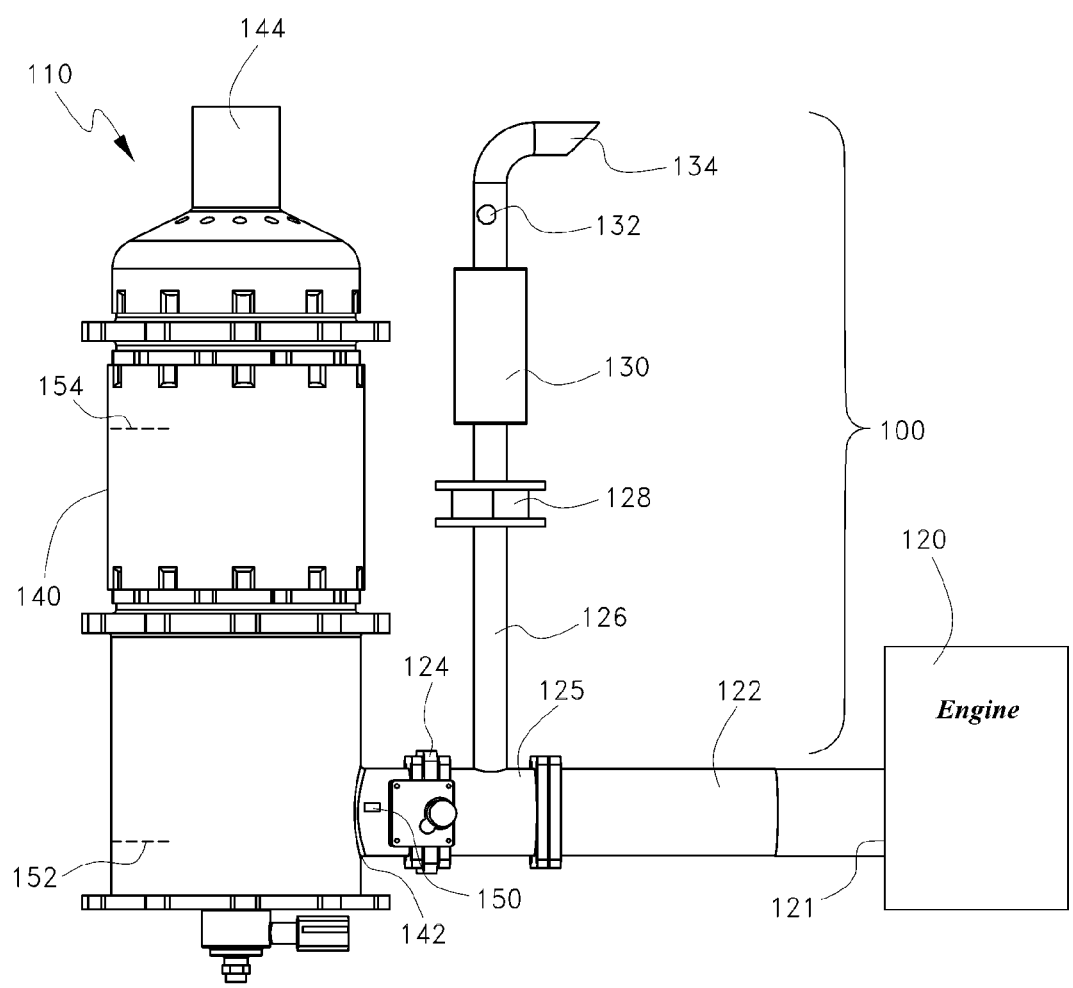
FIG. 1 is a schematic representation of a safety device and an exhaust gas aftertreatment device that is arranged and configured in accordance with certain features, aspects and advantages of the present invention.

FIG. 1 illustrates a safety device 100 for a diesel exhaust gas aftertreatment system 110. The illustrated safety device 100 desirably reduces the likelihood that a particulate overloading condition within a diesel particulate filter (DPF) 140 of a diesel exhaust gas aftertreatment system 110 may result in excessive temperatures and pressures that could damage the substrate of the particulate filter. In some configurations, the safety device 100 reduces the likelihood of damage to the DPF 140 by physically removing the DPF 140 from the exhaust stream in response to specific, predetermined conditions that are suspected of promoting auto-regeneration conditions, which may involve excessive heat and pressure. The safety device 100 may be used with any diesel exhaust aftertreatment system, including the system disclosed in U.S. Patent Publication No. 2011/0041478 A1, which is hereby incorporated by reference in its entirety.

In some configurations, the safety device 100 desirably reduces the likelihood of a thermal runaway event within the DPF 140 because the safety device 100 desirably reduces the likelihood of the operator ignoring warnings and alarms emitted by the system indicating a likely overloaded condition within the substrate of the DPF 140. As a result, the safety device 100 reduces the likelihood of an over temperature condition within the metal, ceramic, or silicon carbide filter substrate due to a regeneration event of the DPF 140 in an overloaded condition.

With reference still to FIG. 1, in some configurations, the safety device 100 is designed as part of an exhaust aftertreatment system 110 containing a diesel particulate filter (DPF) 140. In some configurations, the addition of the safety device 100 does not significantly alter the filtering capacity, efficiency, or general operation of the DPF 140 during normal operation. For example, the safety device 100 desirably reroutes engine exhaust flow and reduces the likelihood of engine exhaust flow to the DPF 140 in the event of an adverse operational condition that could otherwise result in a thermal runaway event. By reducing the likelihood of exhaust flow to the DPF 140 under certain abnormal operating conditions, oxygen and heat desirably are rerouted away from the filter system and therefore are less likely to contribute to a thermal event within the DPF. Therefore, the safety device 100 desirably reduces the likelihood of a thermal condition that may melt or otherwise damage the substrate of the DPF 140 or cause other damage to the exhaust aftertreatment system 110.

As shown schematically in FIG. 1, a diesel engine 120 has an exhaust gas outlet 121 that is connected to engine exhaust pipe 122. The exhaust gas outlet 121 can be the outlet of an exhaust manifold, a conduit downstream from the manifold or the like. Exhaust gas from the engine 120 flows through the exhaust pipe 122 towards the exhaust aftertreatment system 110.

In the illustrated configuration, the exhaust aftertreatment system 110 comprises a diesel particulate filter (DPF) 140 contained within a housing. The housing includes an exhaust gas inlet 142 and an exhaust gas outlet 144. During normal operation of the exhaust aftertreatment system 110, including the diesel particulate filter 140, exhaust gas flows from the inlet 142, through the DPF 140, to the outlet 144. Within the DPF 140, the exhaust gas is filtered of particulates.

In some configurations, a thermocouple 152 can be placed at or near the exhaust gas inlet 142 of the DPF 140. The inlet thermocouple 152 can measure the temperature of exhaust gas entering the DPF 140. In some configurations, a thermocouple 154 can be placed at the exhaust gas outlet 144 of the DPF 140. The exhaust thermocouple 154 can measure the temperature of exhaust gas exiting the DPF 140. Other techniques also can be used to measure the temperature of the exhaust gases entering or exiting the DPF 140.

With continued reference to FIG. 1, a safety device 100 can be located upstream of the DPF 140. In some configurations, the safety device 100 is located along the flow of exhaust gases from the engine 120 to the outlet 144 of the DPF 140. In some configurations, the safety device is located closer to the exhaust outlet 121 (e.g., at the end of the exhaust manifold) than to the DPF 140. In some configurations, the safety device is located closer to the DPF 140 than to the exhaust outlet 121. In some configurations, the safety device 100 is located immediately before the inlet to the DPF 140. In some configurations, no other conduit is positioned between the safety device 100 and the DPF 140. In some configurations, the safety device 100 is coupled directly to the DPF 140.

With continued reference to FIG. 1, the illustrated safety device 100 generally comprises a safety valve 124, a coupling 125, a secondary exhaust tube 126, a rupture disk contained within a housing 128, and a mini DPF filter 130. When the aftertreatment system 110 senses an abnormal condition within the DPF 140, such as an overloaded condition, the safety device 100 will reduce the likelihood of exhaust gas flow from the engine to the DPF 140 by closing the valve 124. Upon closure of the valve 124, exhaust gas will flow from the engine 120, through the exhaust pipe 122 and into the coupling 125. In some configurations, flow through the DPF 140 will be stopped by the valve 124. In some configurations, the coupling 125 can provide a secondary exhaust gas flow route from the engine 120. As engine exhaust gas passes into the secondary exhaust tube 126, pressure will build up within the secondary exhaust tube 126. The rupture disk contained within the housing 128 desirably will rupture when exposed to backpressure above the pressure rating of the rupture disk. This backpressure condition may occur, for example, when exhaust gases are rerouted due to closure of the safety valve 124 or, by way of another example, if exhaust system pressures climb too high due to overloading of the DPF 140 because of an accumulation of particulate matter. Upon rupture, exhaust gas will flow into the mini DPF 130, where it is filtered before being emitted to the atmosphere through the safety device exhaust outlet 134.

In some configurations, the redirection of exhaust gas flow advantageously triggers a notification system that notifies the operator that there is an issue with the aftertreatment system 110. In some configurations, the triggering is automatic. Notification to the operator may be in the form of an audible horn or may use a DPF controller unit located within the cab of the vehicle, for example but without limitation. The alert desirably continues until the issue with the DPF 140 and/or the valve 124 is resolved.

Figure 2A:
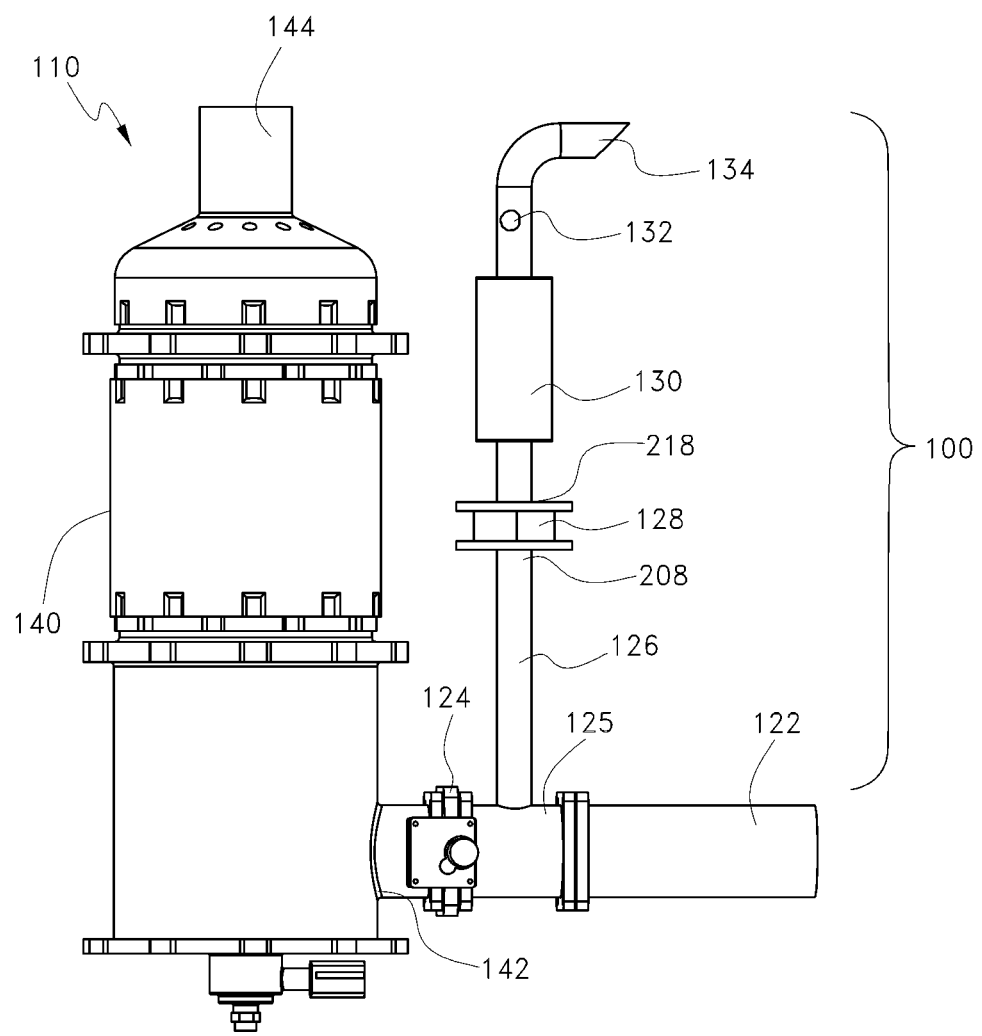
FIG. 2A is a representation of a safety device and an exhaust gas aftertreatment device.
Figure 2B:
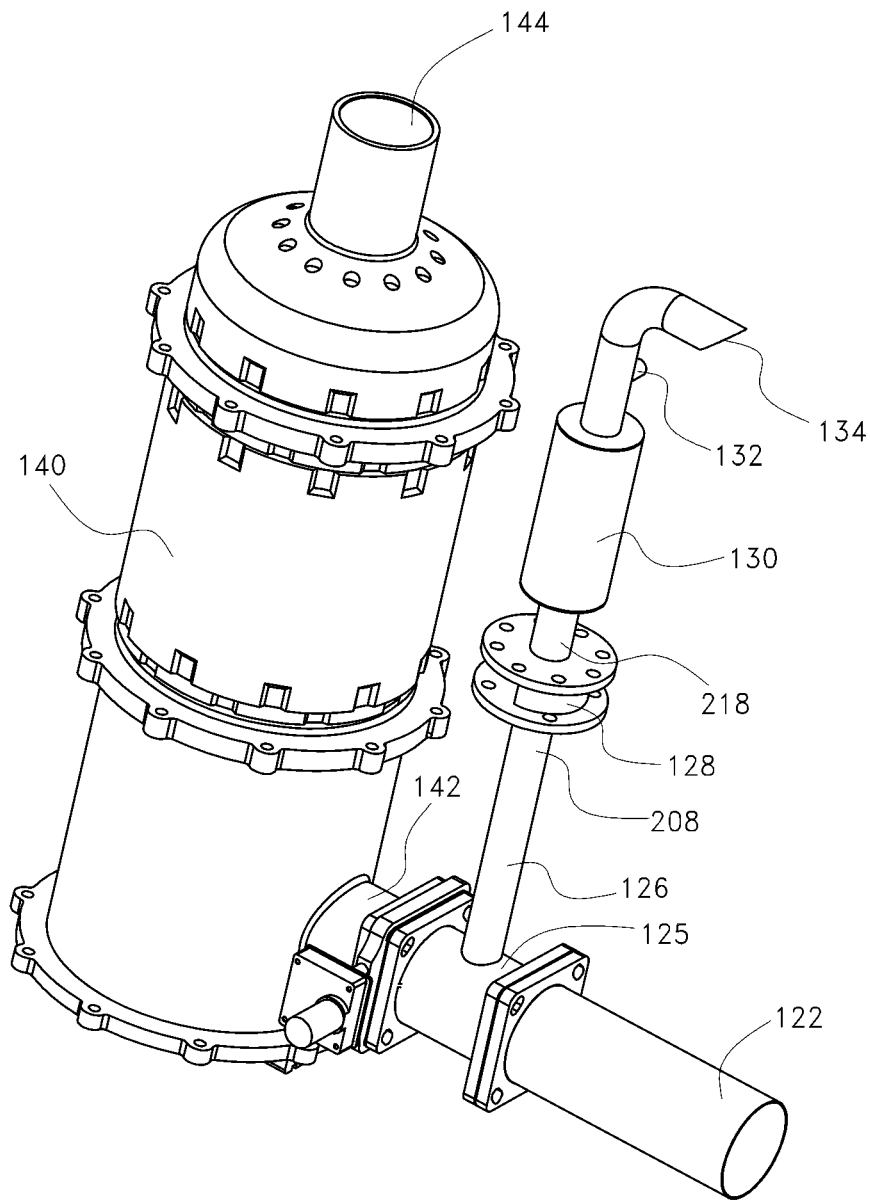
FIG. 2B is a perspective view of the safety device and the exhaust gas aftertreatment device shown in FIG. 2A.
Figure 3:
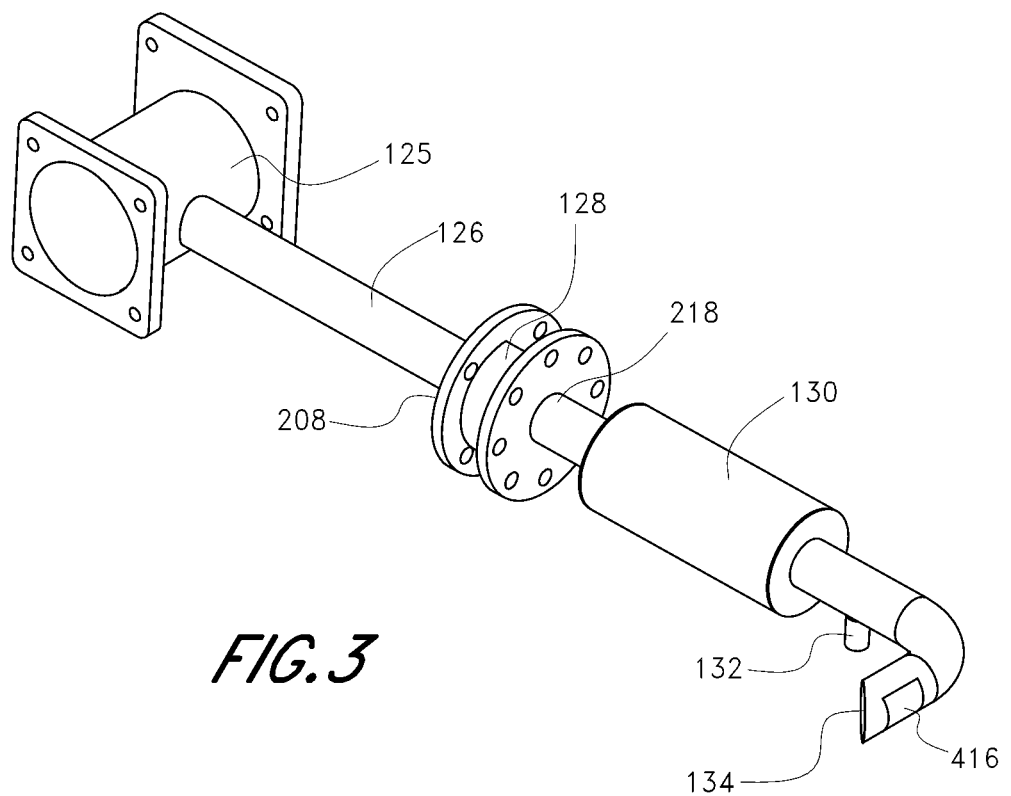
FIG. 3 is a perspective view of the safety device.

FIGS. 2A, 2B, and 3 illustrate one embodiment of the safety device 100 that is arranged and configured in accordance with certain features, aspects and advantages of the present invention. FIGS. 2A and 2B show the safety device 100 as part of a diesel exhaust aftertreatment system 110. FIG. 3 shows the safety device 100 apart from a diesel exhaust aftertreatment system. As shown, the illustrated safety device 100 comprises the coupling 125 to couple the safety device to the exhaust pipe 122 associated with the diesel engine 120. As shown in FIGS. 1, 2A and 2B, the safety device 100 preferably is coupled to the exhaust pipe upstream of the DPF 140. The coupling 125 desirably provides an interface between the safety device 100 and the DPF 140. In some configurations, the coupling 125 allows for simple 4-bolt connection of the safety device 100 to the exhaust aftertreatment system 110. Any other suitable connection technique also can be used.

In some configurations, redirection of the flow of exhaust gas from the DPF 140 to the safety device 100 occurs through the closure of the safety valve 124. In some configurations, the function of the safety valve 124 is to close off the flow passage from the engine 120 through the exhaust gas outlet 144 of the DPF 140. In some configurations, the function of the safety valve 124 is to close off the flow passage through the DPF 140. In some configurations, the function of the safety valve 124 is to close off the flow passage through the exhaust pipe 122 such that exhaust gas is substantially or completely restricted from passing into the DPF 140 and is forced to exit the exhaust system by means of alternate routing through the safety device 100. The safety valve 124 may be closed after the system senses or detects an abnormal condition within the DPF 140 or upon indication or occurrence of other closure conditions, such as those discussed in further detail below, for example but without limitation.

Figure 4:
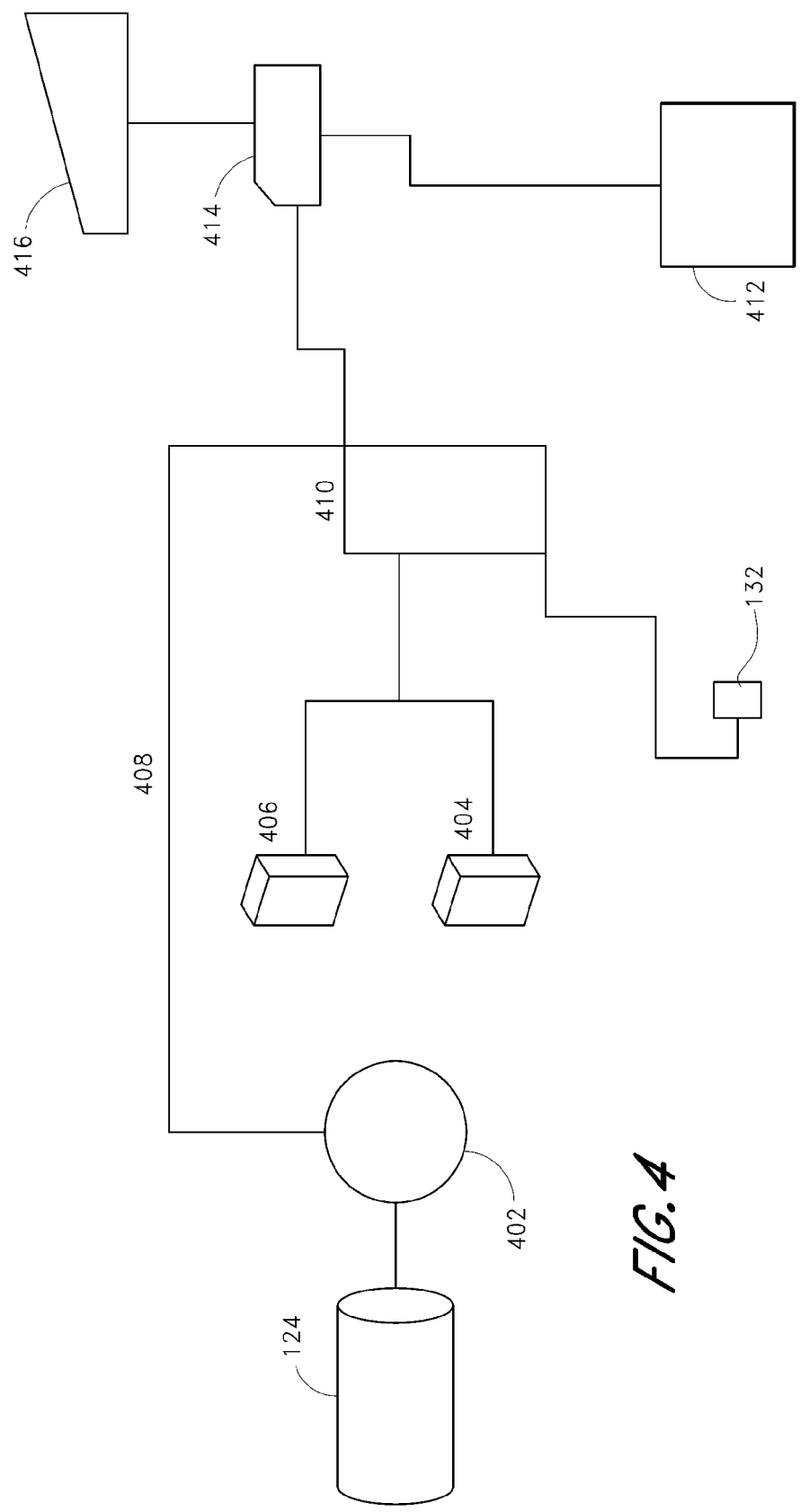
FIG. 4 is a schematic representation of an electronic control system configured to control a valve within the safety device.

The safety valve 124 can be a butterfly-style valve, although other valve types may be used. In a preferred embodiment, the valve 124 is a double seal butterfly valve such as those manufactured by Race Ready Performance, LLC as part number 5410000 or 5510000. In some configurations, the safety valve 124 has two position sensors 404, 406, which are schematically shown in FIG. 4, incorporated within it in order for the system to receive feedback and confirmation that the valve 124 is in a position requested by the electronic control unit (ECU). Indication to the system of valve position failure initiates an error code within the ECU and triggers a notification to the operator, as will be discussed in further detail below.

When flow has been redirected to the safety device 100 due to closure of the safety valve 124, for example, flow enters the secondary exhaust tube 126. The secondary exhaust tube 126 desirably has a significantly reduced diameter as compared to the exhaust pipe 122 from the engine. In some configurations, the ratio of the diameter of the secondary exhaust tube 126 to the diameter of the exhaust pipe 122 is less than 1. In some configurations, the diameter of the secondary exhaust tube 126 may be less than one half the diameter of the exhaust pipe 122. In some configurations, the diameter of the secondary exhaust tube 126 may be less than one quarter the diameter of the exhaust pipe 122. The smaller diameter of this tube 126 produces a backpressure effect on the engine 120, resulting in decreased engine performance which desirably provides another indication to the operator of an abnormal condition within the DPF 140.

As discussed above with reference to FIG. 1, when the backpressure exceeds the pressure rating of the rupture disk, the disk will rupture and allow exhaust gas to flow into the mini DPF 130. With further reference to FIGS. 2A and 2B, the rupture disk is contained within the housing 128 to protect it from exposure. The disk preferably can be housed within the housing 128, which is a two-sided clamp-style housing in the illustrated configuration. Preferably, the housing 128 substantially evenly distributes clamping load around the outside of the disk to provide substantially even loading under pressure. The housing 128 for the rupture disk has an inlet 208 and an outlet 218 to allow exhaust gas to flow from the engine 120 and through the secondary exhaust tube 126 and into the mini DPF 130 after the disk has been ruptured.

The rupture disk is positioned between the inlet 208 and the outlet 218 of the housing 128. The rupture disk generally blocks the flow of exhaust gas until sufficient pressure causes the disk to fail or burst. The rupture disk desirably functions as a pressure relief mechanism during normal operation of the exhaust aftertreatment system 110 as well as when the safety valve 124 is closed and exhaust gases are forced out the alternative routing. The rupture disk can be a hockey puck shaped graphite disk that is placed directly in the alternate exhaust flow path. In a preferred configuration, the rupture disk may be a mono type graphite rupture disk manufactured by Zook Enterprises, LLC, part number CF118306, with a burst pressure of 15 psig at 100 degrees F. and a burst tolerance of +/−2 psi.

Upstream of the rupture disk housing 128 is the coupling 125 and downstream of the rupture disk 128 is the mini-DPF filter 130. To generally protect the rupture disk from outside tampering, the housing can be configured to thwart unauthorized access. In some configurations, for example, four ½ inch×3 inch long bolts may be welded to the fastener nuts during installation to reduce the likelihood of undetected access to the rupture disk within the housing 128. In some configurations, the mini-DPF filter 130 is located downstream of the rupture disk and the housing 128 and a bend is included in the exit exhaust tube 134 of the safety device 100. The bend in the exit exhaust tube 134 reduces the ability to tamper with the rupture disk. In some configurations, the bend is about 90 degrees. In some configurations, the bend is greater than about 90 degrees. In some configurations, the bend comprises multiple bends in differing directions.

Once the rupture disk has failed or burst, exhaust flow continues into the mini DPF 130. The mini DPF 130 is desirably an uncatalyzed mini filter and will collect particulate matter from the exhaust stream. Additionally, the mini DPF 130 desirably provides backpressure to the engine that reduces engine performance and preferably forces the vehicle operator to take action to correct the issue relating to the exhaust aftertreatment system 110 and the DPF 140. The mini filter 130 desirably has a limited capacity to hold particulate material and in a preferred embodiment will reach capacity after less than 15 minutes of operation of the engine after closure of the safety valve 124. In some embodiments, capacity of the mini DPF 130 will result in backpressure exceeding 500 millibars, exceeding 750 millibars, or exceeding 1000 millibars. In a preferred embodiment, the mini filter 130 may be an uncatalyzed silicon carbide filter manufactured by Notox Ceramic Filters A/S (part number 5432100) or Liq-Tech NA, Inc. (part number 5432200). In other configurations, the mini filter 130 may be a ceramic diesel particulate filter.

FIGS. 1, 2A, 2B, and 3 also illustrate a preferred placement of a thermocouple 132 within the safety device 100 downstream of the mini DPF 130. Desirably, the thermocouple 132 will measure the temperature of the exiting exhaust gas. These measurements desirably are used to indentify a condition in which the rupture disk 128 has failed or burst. In a preferred embodiment, the thermocouple 132 may be made of 316 stainless steel with a K-type range of about 0200 to 1250 degrees Celsius and an output between 0 and 50 mV, such as those manufactured by SungYeon Sensor, part number 5433200.

In some configurations, such as that shown in FIG. 3, an annunciator, such as a horn 416 for example but without limitation, may be placed on the safety device 100 at the outlet 134 of the safety device or near the operator. In some configurations, the annunciator can make an audible alert as a result of exhaust gas flow through one or more channel in the annunciator such that the annunciator operates automatically upon flow through the safety device. In some configurations, as shown in FIG. 4, the annunciator or horn 416 desirably is activated by the ECU whenever the safety valve 124 is commanded closed, as will be discussed in further detail below. The horn 416 may also be activated when the safety valve 124 is suspected of malfunctioning. In one embodiment, the horn 416 is commanded on by the ECU and obtains power from a standard automotive relay. In a preferred embodiment, the horn 416 is a standard style "D" or vibration horn used on existing trucks and automobiles.

To reduce the likelihood of outside tampering with the annunciator 416, in a preferred embodiment, the horn 416 may be mounted in a tamper-proof box that exposes only the front diaphragm surface of the horn 416. In such an embodiment, the power wires of the horn 416 may exit the box through a piece of metal conduit that extends away from the annunciator 416 assembly and underneath the vehicle cab.

After the rupture disk has failed and exhaust gas is utilizing the alternative exhaust path provided by the safety device 100, vehicle operators desirably will be forced to take action to fix the issues with the DPF 140. Until the issue with the DPF 140 is fixed, the safety device 100 will produce a high decibel sound, via the annunciator 416, which preferably is noticeable both to the operator and others near the vehicle.

In some configurations, the safety device 100 is configured such that, as the mini filter 130 becomes increasingly loaded, it causes significant performance reductions of the vehicle engine and powertrain and desirably will reduce the likelihood of the operator utilizing the full power potential of the engine 120. Full performance of the engine desirably is realized after the issue with the DPF 140 has been resolved and after replacement of the rupture disk and replacement of the mini DPF 130 within the safety device 100.

Electrical Connections

FIG. 4 illustrates one embodiment of an interface between the safety device 100 and the electronic control unit (ECU) 410 of the exhaust aftertreatment system 110. In the illustrated configuration, the safety valve 124 is driven by an actuator 402, which receives a control signal 408 from the ECU 410. The control signal 408 signals the valve 124 to open or close depending on the conditions sensed within the exhaust aftertreatment system 110. Two sensors 404 and 406 are desirably provided within the safety device 100 to monitor the open or closed status of the safety valve 124. In some configurations, a single sensor can be used. The illustrated thermocouple 132 can be placed in the exit of the mini DPF 130 to monitor the temperature of the exhaust gas leaving the mini DPF 130. The temperature of the exhaust gas leaving the mini DPF 130 can be sent to the ECU 410. The horn or other annunciator 416 desirably is connected to the ECU 410 through a relay 414. When the system determines that the safety valve 124 is closed or upon other conditions as described below, the ECU 410 sends a signal that activates the annunciator in order to provide an audible alert of an undesirable condition within the DPF system 140. Power to the ECU 410 desirably is provided by the vehicle battery 412.

Diagnostic Check Routine

Figure 5:
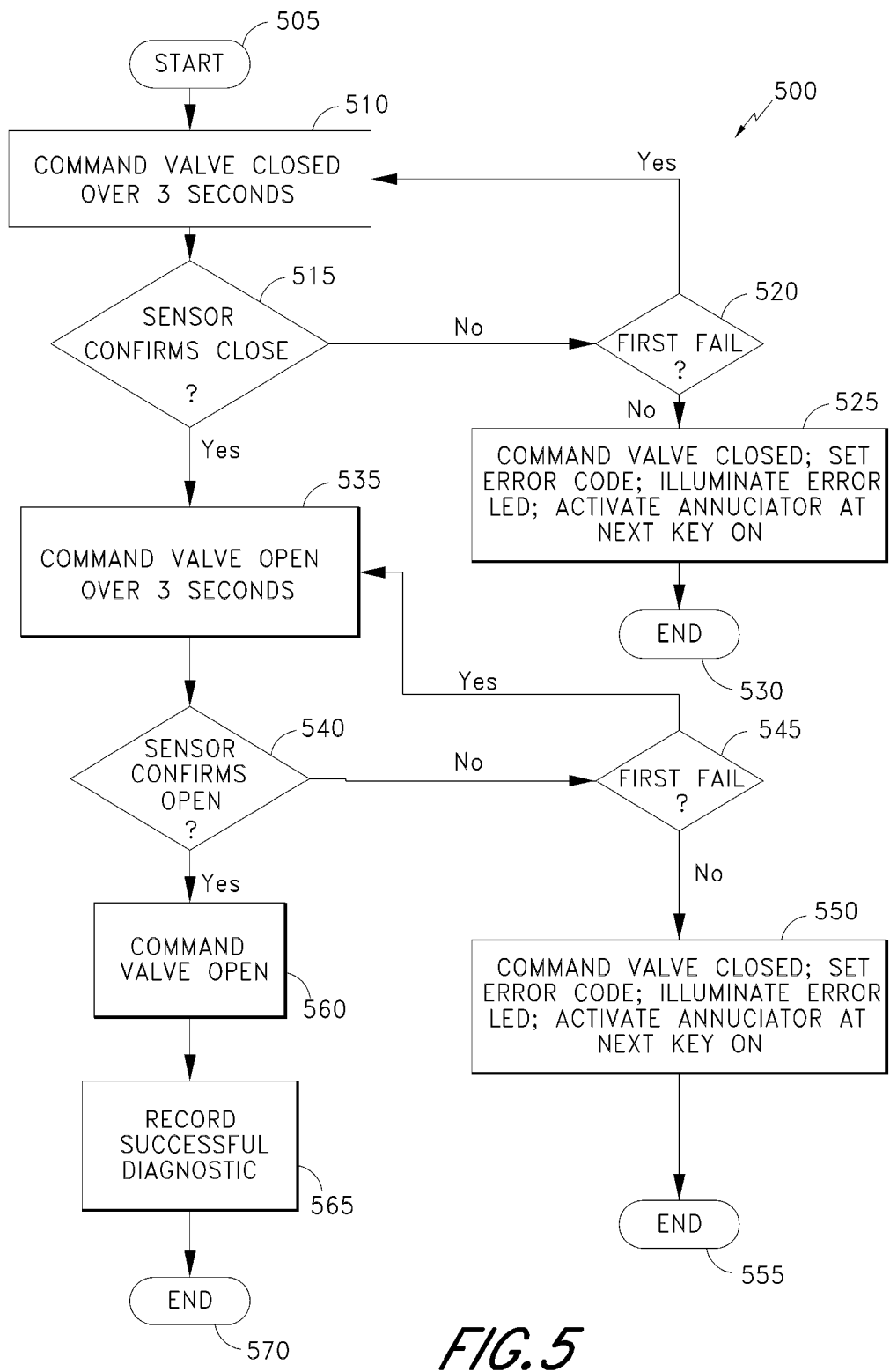
FIG. 5 is a flow diagram depicting a process for performing a diagnostic test of a safety valve of a safety device that is arranged and configured in accordance with certain features, aspects and advantages of the present invention.

As discussed above, the safety valve 124 is used to change the flow path of engine exhaust gases from passing through the DPF 140 to passing through the mini-DPF 130 of the safety device 100. Accordingly, if the safety valve 124 is not operating properly, there is a risk of the safety device being ineffective. Accordingly, a flow diagram illustrating a process 500 of performing a diagnostic check of the safety valve 124 is shown in FIG. 5. The process can be performed when the engine is stopped, prior to the engine being started or at any suitable time period. In some configurations, the process is initiated while the engine is off. In some such configurations, the process is initiated during predetermined intervals while the engine is off.

The process 500 begins at start block 505 and transitions to block 510 in which instructions direct that the safety valve 124 is commanded closed. In some configurations, the valve 124 is closed for a predetermined period. In some configurations, the valve is closed for a period of over 3 seconds.

With the safety valve 124 moved into a position that is believed to be closed, the sensor 404 is used to confirm whether the valve 124 has closed. See 515. If the sensor 404 confirms that the valve 124 has not closed, instructions are given to determine whether this is the first failure condition. See 520. If it is the first failure, then the command close instruction is repeated. See 510. If, however, confirmation by the sensor 404 that the valve 124 has closed has failed more than once, instructions direct the valve 124 to be commanded closed, an error code is set, an ERROR LED is illuminated for display to the operator, and the annunciator is activated at the next key ON event. See 525. Once this has been completed, the process 500 ends. See 530.

However, if the sensor 404 confirms closure of the valve 124, instructions direct the valve 124 to be commanded open. See 535. In some configurations, the valve 124 opens over a period. In some configurations, the valve opens over the course of 3 seconds.

Instructions then direct the sensor 406 to confirm whether the valve 124 has opened as commanded. See 540. Similar to the process described above, if the sensor 406 confirms that the valve 124 has not opened, instructions are given to determine whether this is the first failure. See 545. If it is the first failure, then the command open instruction is repeated. See 535. If, however, the sensor 406 has more than once failed to confirm that the valve 124 opened as commanded, the valve 124 is commanded closed, an error code is set, an ERROR LED is illuminated, and the annunciator is activated at the next key ON event. See 550. Once this has been completed, process 500 ends. See 555.

However, the sensor 406 confirms that the valve 124 has opened as commanded (see 540), instructions direct the valve 124 to be commanded open such that exhaust gas may flow into the DPF 140. See 560. The instructions then direct recording a successful valve diagnostic test (see 565) and the process 500 ends (see 570).

Initiation of Valve Diagnostic Test

Figure 6:
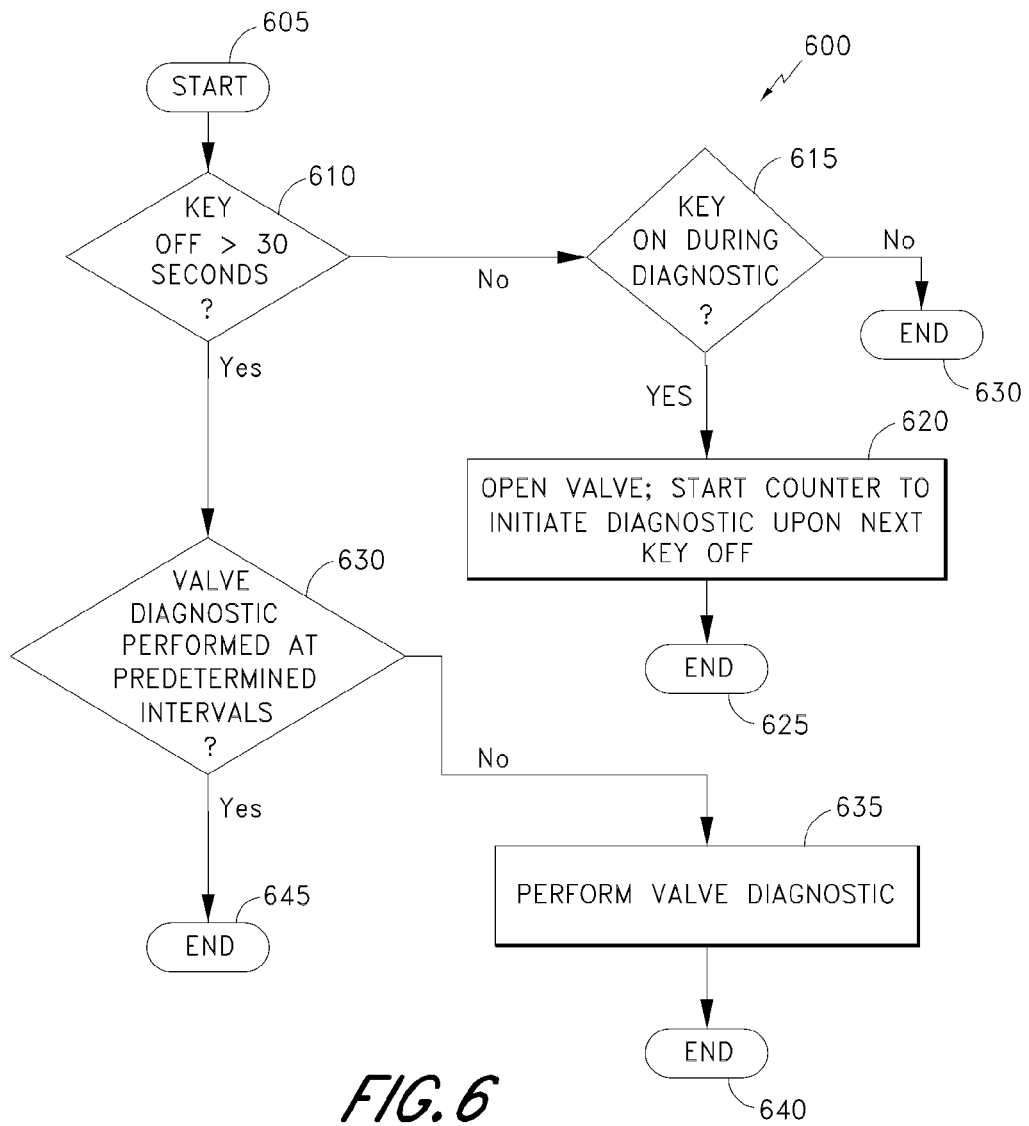
FIG. 6 is a flow diagram depicting a process for determining whether to perform a valve diagnostic process such as that described in FIG. 5.

FIG. 6 depicts a process 600 for determining whether to run a diagnostic check of the valve 124, as discussed above with respect to process 500 depicted in FIG. 5. The diagnostic check can be run during predetermined intervals while the engine is not operating. In some configurations, the diagnostic check is only initiated while the ignition key is in the off position.

The process 600 begins (see 605) and instructions are given to determine whether an ignition key has been in the OFF position for more than 30 seconds (see 610). An ignition key in the OFF position indicates that the engine 120 is not operating.

If the ignition key has not been in the OFF position for more than 30 seconds, instructions are given to determine whether an ignition key has been turned to the ON position during the diagnostic process. See 615. An ignition key in the ON position indicates that the engine 120 is operating.

If the ignition key has been turned to the ON position, instructions are given to open the valve 124 and start a counter to initiate the valve diagnostic process 500 outlined in FIG. 5 upon the next ignition key OFF event. See 620. The process 600 then ends. See 625.

If, however, the ignition key has not been turned to the ON position during the diagnostic, the process 600 ends. See 630.

If the ignition key has been in the OFF position for more than 30 seconds (see 610), instructions are given to determine whether the valve diagnostic illustrated in FIG. 5 has been performed at prescribed intervals. See 630. In some configurations, these intervals may be after 1 hour of operation, after 8 hours of operation, and after each additional 8 hours of operation after the first 8 hours of operation, for example but without limitation. If the valve diagnostic has been performed at each of the prescribed intervals, the process 600 ends. See 645. If, however, the valve diagnostic has not been performed at the predetermined intervals, instructions direct the performance of the valve diagnostic process 500 illustrated in FIG. 5. See 635. The process 600 then ends. See 640.

Method of Operation of Safety Device

A method of operation of the safety device 100 that is arranged and configured in accordance with certain features, aspects and advantages of the present invention is illustrated in FIGS. 7A-7D.

Figure 7A:
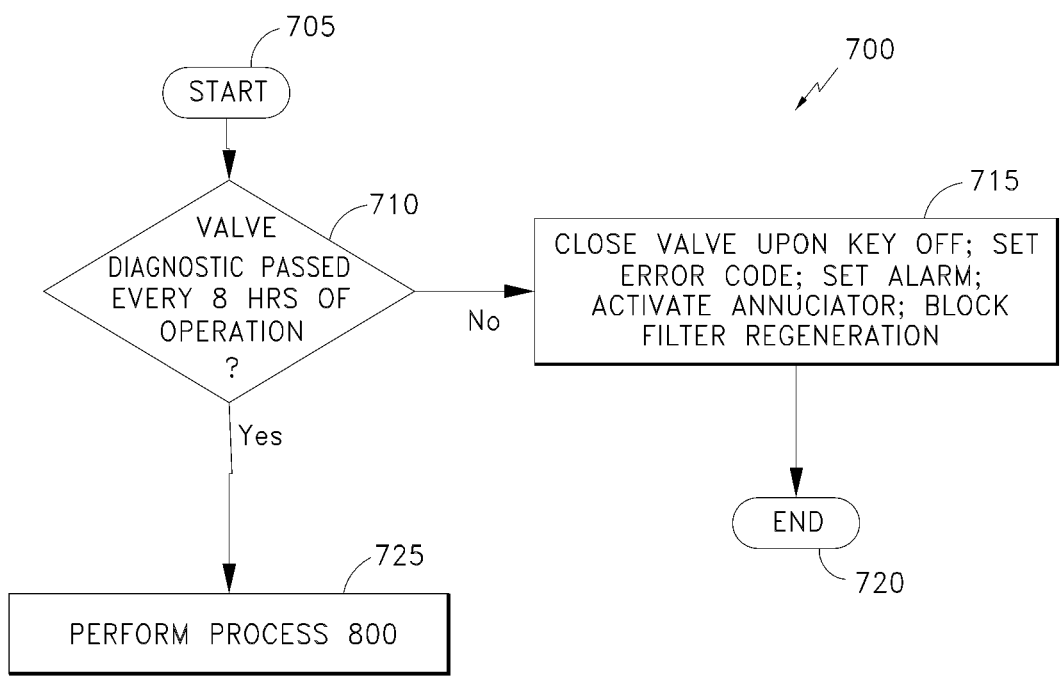
FIG. 7A is a flow diagram depicting a partial method of operation of the safety device.

FIG. 7A illustrates a method of operation that increases the likelihood of completion of the valve diagnostic process outlined in FIG. 5. See 700. As illustrated, once started (see 705), instructions are given to determine whether the valve diagnostic process, such as that illustrated in FIG. 5 for example but without limitation, has been passed (i.e., successfully completed) after each desired time interval of engine operation. See 710. In some configurations, the desired time interval is after every 8 hours of engine operation, but other intervals can be used.

If the valve diagnostic process 500 has not been executed when the diagnostic is run after each desired period of engine operation, instructions direct the closure of valve 124 (i.e., blocking exhaust gas flow to the DPF 140), an error code is set, an alarm is set that is visible to the operator, the annunciator is activated, and DPF 140 regeneration is blocked. See 715. The process 700 then ends. See 720. If the valve diagnostic process 500 has been run and has been passed after every desired period of engine operation, instructions direct the performance of the next process 800, which illustrated in FIG. 7B. See 725.

Figure 7B:
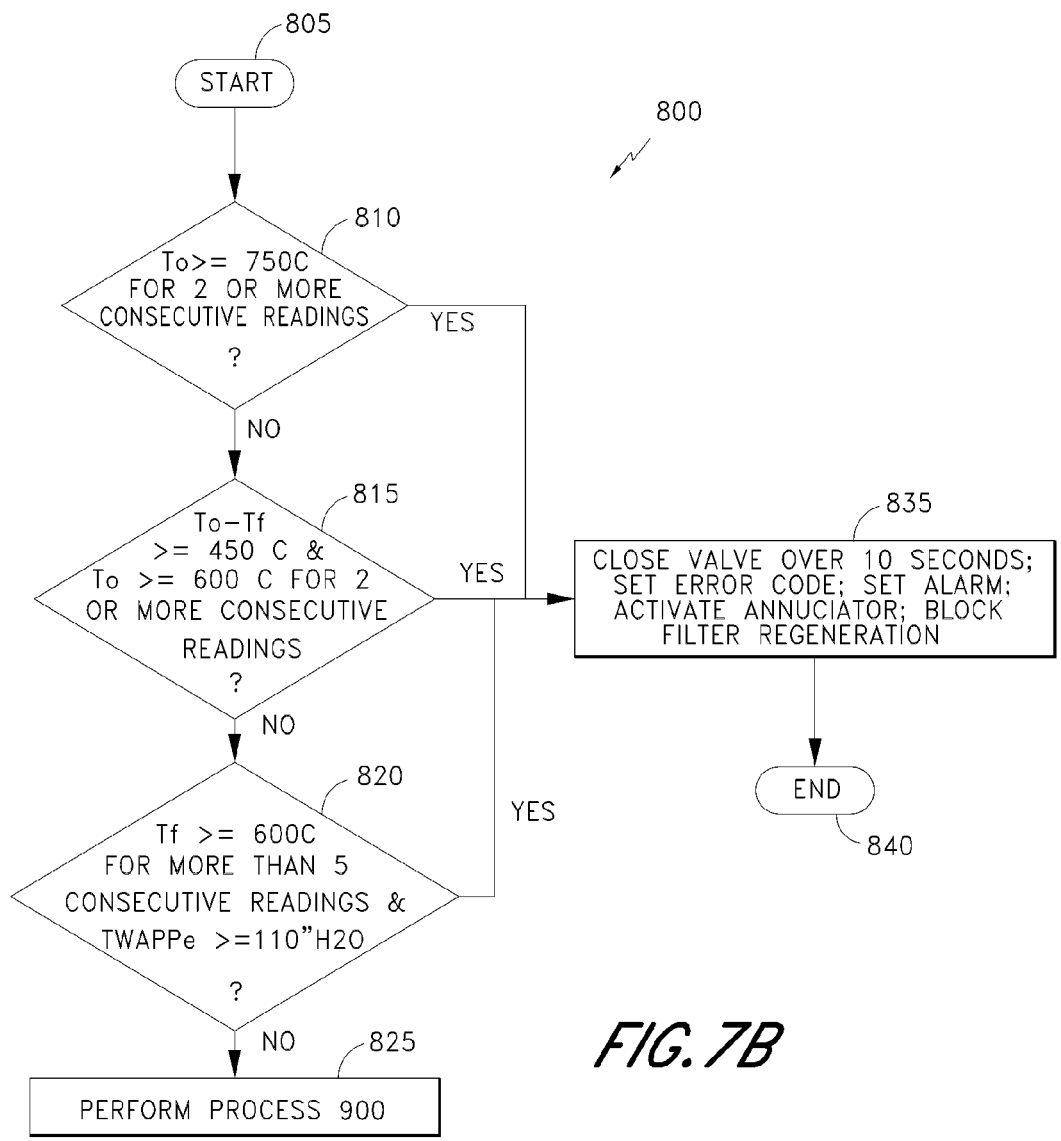
FIG. 7B is a flow diagram continuing the method of operation of the safety device depicted in FIG. 7A.

FIG. 7B illustrates a method of operation that sets an alarm code if specified temperatures are exceeded within the DPF 140. See 800. After the process 800 begins (see 805), instructions direct the determination of the temperature at the outlet (To) of the DPF 140. See 810. In some configurations, the temperature is measured by a thermocouple 154 that is located at the outlet of the DPF 140. If the temperature To is greater than or equal to about 750 degrees Celsius for two or more consecutive readings, instructions direct the closure of the valve 124, set an error code, set an alarm visible to the operator, activate the annunciator, and block DPF 140 regeneration. See 835. In some configurations, the valve 124 is commanded closed over a preset period of about 10 seconds but other preset periods can be used. While the valve 124 is closed, in some configurations, exhaust gases cannot flow into the DPF 140. After the valve 124 has been closed, the process 800 then ends. See 840.

If, however, the temperature To has not been greater than or equal to about 750 degrees Celsius for two or more consecutive readings, instructions direct the determination of the temperature differential across the DPF 140, given by To-Tf, in which To is as defined above and Tf is the temperature at the inlet of the DPF 140. See 815. In some configurations, the temperature Tf is measured by the thermocouple 152. Other configurations also are possible. If the temperature differential To-Tf across the filter 140 is greater than or equal to about 450 degrees Celsius and To is greater than or equal to about 600 degrees Celsius for two or more consecutive readings, instructions direct closure of the valve 124 and alarm activation, as described above. See 835. As above, the process 800 then ends. See 840.

If, however, the conditions above have not been present for 2 or more consecutive readings, instructions direct the determination of Tf and TWAPPe, the latter defined as a time weighted average peak pressure calculation as disclosed in U.S. Provisional Patent Application No. 61/594,158, which is hereby incorporated by reference in its entirety. See 820.

Pressure measurements on the upstream side of the DPF 140 can be a function of particulate loading, engine duty cycle and, to some degree, temperature. In order to provide a more robust pressure limit for identification of filter loading and regeneration points, an averaging methodology was developed and disclosed in U.S. Provisional Patent Application No. 61/594,158. This methodology combines an averaging method with a peak and hold concept to determine not an instantaneous pressure measurement on the upstream side of the DPF 140 but a pressure that takes into account peak pressures and engine idle pressures. The peak and hold function recognizes that there may be extended idle periods not reflective of the level of particulate loading in the filter. The time-weighted-average methodology preferably allows for different time periods for the time-weighted average to be calculated, from seconds in some embodiments to 15 minutes or more in other embodiments.

The equation for TWAPPe may be given as follows:

$$TWAPPe_n = A*TWAPPe_{n-1} + B*(0.5*TWA_n + 0.5*TWA_n + 0.5*TWA_{n-1})$$

where TWA is the running time weighted average of Pe for x minutes, given by $$TWA = \Sigma Pe_1 \ldots _x/x, \Sigma Pe_2 \ldots _{x+1}/x, \text{etc.}$$

Pe is defined as the instantaneous pressure on the upstream side of the DPF 140 measured at 1 Hz frequency.

The coefficients A and B are experimentally determined coefficients based on particulate loading of the DPF 140.

To determine if a pressure threshold has been reached, $TWAPPe_{new}$ is calculated as follows:

$$TWAPPe_{new} = IF(TWA_n > TWAPPe_n, TWAPPe_{n-1})$$

Returning to FIG. 7B, if the temperature Tf is greater than or equal to about 600 degrees Celsius for more than five consecutive readings and TWAPPe as calculated above is greater than or equal to about 110 inches of $H_2O$ (see 820), then instructions direct closure of the valve 124 and activate the alarm and activate the annunciator. See 835. The process 800 then ends. See 840.

Figure 7C:
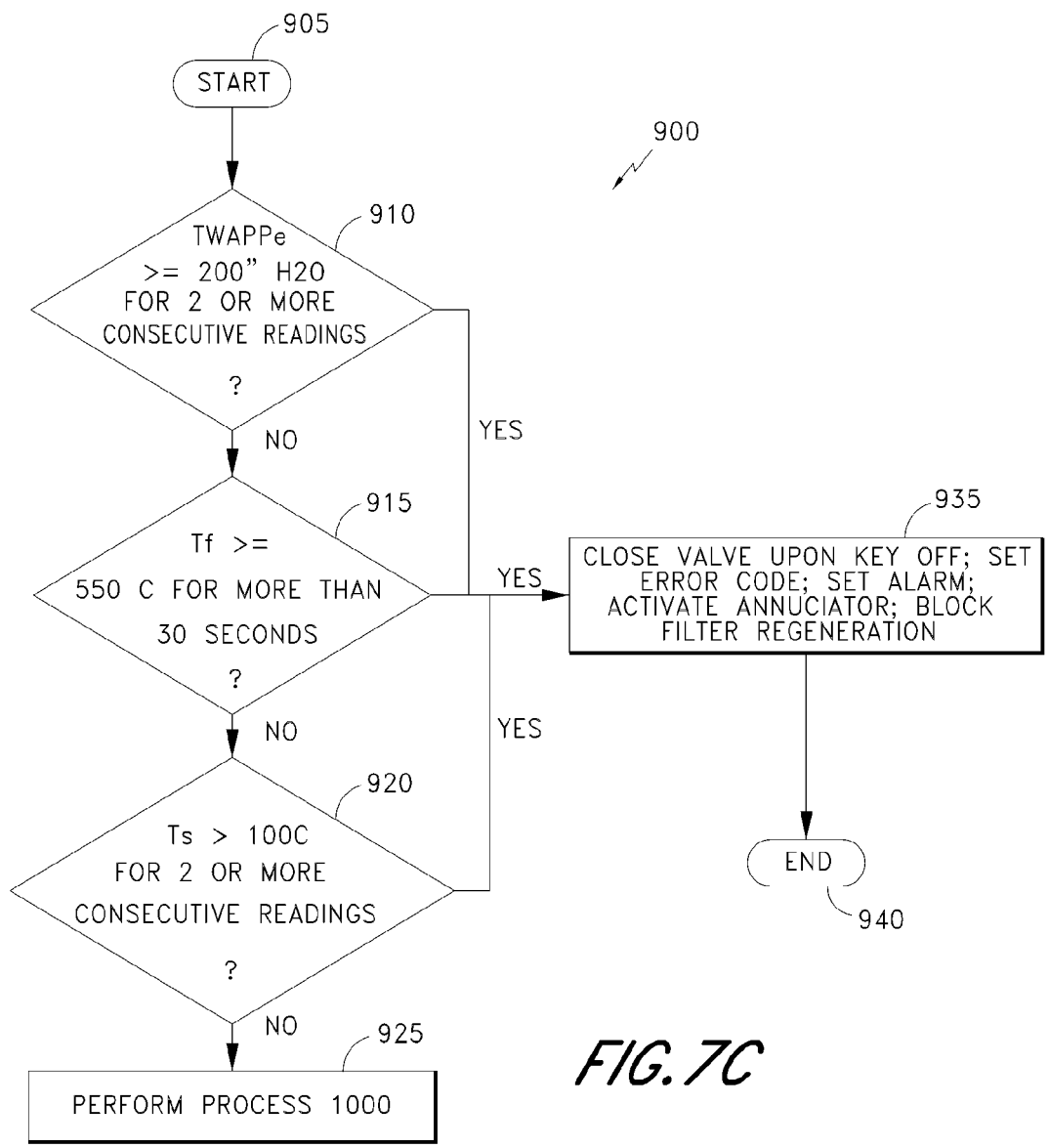
FIG. 7C is a flow diagram continuing the method of operation of the safety device depicted in FIG. 7B.

If, however, the conditions described above (see 820) have not been met, then instructions direct the performance of the next process 900, illustrated in FIG. 7C. See 825.

FIG. 7C illustrates a method of operation that sets an alarm code if specified temperatures are exceeded within the DPF 140. After starting (see 905), instructions direct the determination of TWAPPe as defined above. See 910. If TWAPPe is greater than or equal to about 200 inches of $H_2O$ for two or more consecutive readings, instructions direct the closure of valve 124 upon the next key OFF event. See 935. In addition, instructions set an error code, set an alarm visible to the operator, activate the annunciator, and block DPF regeneration, for example but without limitation. See 935. Process 900 then ends. See 940.

If, however, TWAPPe has not been greater than or equal to about 200 inches of $H_2O$ for two or more consecutive readings, instructions direct the determination of Tf, the temperature at the inlet of the DPF 140. See 915. If the temperature Tf is greater than or equal to about 550 degrees Celsius for more than thirty seconds, instructions direct closure of the valve and alarm activation, as described above. See 935. As above, the process 900 then ends. See 940.

If, however, the conditions described above (see 915) have not been present for more than thirty seconds, instructions direct the determination of Ts or the temperature at the outlet of the safety device 100. See 920. In some configurations, the temperature at the outlet of the safety device 100 is measured by the thermocouple 132, such as that shown in FIG. 3. If the temperature Ts is greater than about 100 degrees Celsius for two or more consecutive readings, instructions direct closure of the valve and alarm activation, as described above. See 935. As above, the process 900 then ends. See 940.

Figure 7D:
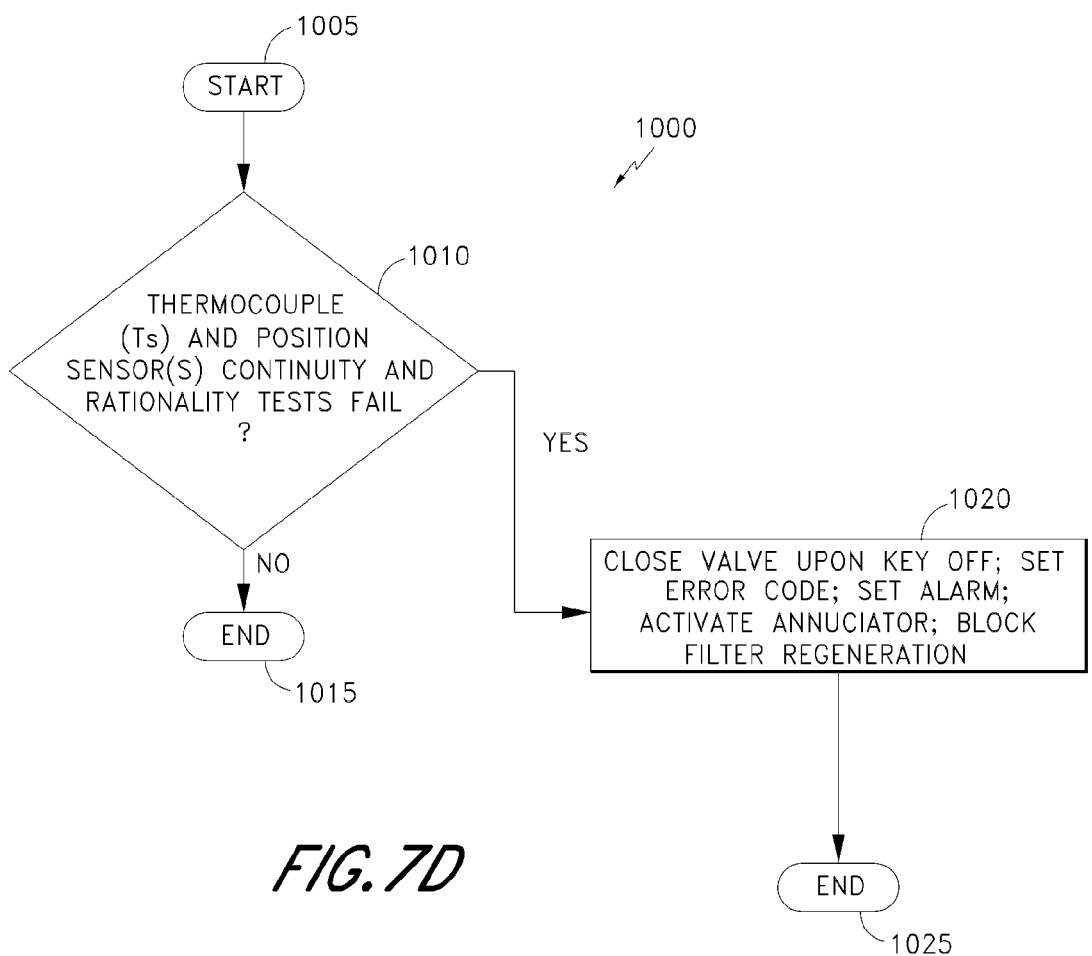
FIG. 7D is a flow diagram continuing the method of operation of the safety device depicted in FIG. 7C.

If, however, the conditions described above (see 920) have not been present for two or more consecutive readings, instructions direct the performance of the next process 1000, illustrated in FIG. 7D. See 925.

FIG. 7D illustrates a method of operation that sets an alarm code and closes the valve 124 if the exhaust aftertreatment system 110 cannot diagnose an issue. After starting (see 1005), instructions direct the determination of proper performance of the thermocouples 152, 154, 132 and the valve position sensors 404, 406 through rationality and continuity tests. See 1010. If these tests fail, instructions direct the closure of the valve 124 upon the next key OFF event, set an error code, set an alarm visible to the operator, activate the annunciator, and block DPF 140 regeneration. See 1020. The process 1000 then ends. See 1025.

If, however, the thermocouples 152, 154, 132 and position sensors 404, 406 do not fail the continuity and rationality tests, the process 1000 ends. See 1015.

Therefore, in some configurations as discussed above, the ECU 410 will, in response to specified conditions, either immediately close the safety valve 124 or close the valve 124 after the key is turned to OFF. In both cases, the valve 124 will desirably remain closed until the issue that caused the ECU 410 to command the valve 124 closed is addressed.

In some configurations, conditions that may trigger immediate closure of the valve 124 include evidence of a thermal event within the DPF 140 as indicated, in one example, by an elevated temperature To reading greater than or equal to about 750° Celsius; a temperature delta across the DPF 140, as indicated by To-Tf, of greater than or equal to about 450° Celsius and a temperature To greater than or equal to about 600° Celsius; or high engine load with a loaded DPF 140, as indicated by temperature Tf greater than or equal to about 600° Celsius and a TWAPPe greater than or equal to about 110 inches of $H_2O$. In some configurations, other specified temperatures and pressures may trigger immediate closure of the valve 124 depending on the specifications of the type of filter 130 used in the safety device 100, among other considerations.

In some configurations, conditions which trigger the valve 124 to be closed at the next key OFF event include, for example, extended operation of the engine with no regeneration of the DPF 140 and excessive backpressure indicated by TWAPPe greater than or equal to about 200 inches of $H_2O$; engine problems causing high temperatures at the filter inlet, indicated by Tf greater than or equal to about 500° Celsius; or temperatures exceeding about 100° Celsius, as detected by the thermocouple Ts, which may indicate a failed rupture disk in housing 128. In some configurations, other specified temperatures and pressures may trigger the valve 124 to be closed at the next key OFF event depending on the specifications of the type of filter 130 used in the safety device 100, among other considerations.

Although the present invention has been disclosed in the context of certain preferred embodiments, examples and variations, it will be understood by those skilled in the art that the present invention extends beyond the specifically disclosed embodiments to other alternative embodiments and/or uses of the invention and obvious modifications and equivalents thereof. For example, in the event of serial production requirements all of the system components can be redesigned/combined etc. for cost effective results. In addition, while a number of variations of the invention have been shown and described in detail, other modifications, which are within the scope of this invention, will be readily apparent to those of skill in the art based upon this disclosure. It is specifically contemplated that various combinations or subcombinations of the specific features and aspects of the embodiments may be made and still fall within the scope of the invention. It should be understood that various features and aspects of the disclosed embodiments can be combined with or substituted for one another in order to form varying modes of the disclosed invention. Moreover, some variations that have been described with respect to one embodiment and not another embodiment can be used with such other embodiments. Many other variations also have been described herein and cross-application is intended where physically possible. Thus, it is intended that the scope of the present invention herein disclosed should not be limited by the particular disclosed embodiments described above, but should be determined only by a fair reading of the claims that follow.

What is claimed is:

1. A safety device for an exhaust gas aftertreatment system comprising:
   a valve located upstream of a first diesel particulate filter and a second diesel particulate filter;
   a pressure relief device located upstream of the second diesel particulate filter; a controller configured to control an actuator which operates the valve between an open state and a closed state such that no exhaust flow passes to the first diesel particulate filter when the valve is closed when the system detects one or more of a predetermined temperature condition of the first diesel particulate filter, and a predetermined pressure condition within the first diesel particulate filter, and a diagnostic condition of the system; and wherein the pressure relief device is a rupture disk.

2. The safety device of claim 1, wherein the valve is a butterfly valve.

3. The safety device of claim 1, wherein the first diesel particulate filter is a metal diesel particulate filter capable of regeneration.

4. The safety device of claim 1, wherein the second diesel particulate filter is one of a ceramic diesel particulate filter and a silicon carbide diesel particulate filter.

5. The safety device of claim 1, wherein the first diesel particulate filter is larger than the second diesel particulate filter.

6. The safety device of claim 1 further comprising an annunciator such that the annunciator sounds if the valve is closed.

7. The safety device of claim 1 further comprising an annunciator such that the annunciator sounds if the valve will be commanded closed at the next key off event.

8. A safety device for an exhaust gas aftertreatment system comprising:
    a body containing a diesel particulate filter; an exhaust gas inlet tube connected to an exhaust pipe, the exhaust gas inlet tube connected to a first end of the body and adapted to introduce exhaust gas to the diesel particulate filter;
    an exhaust gas outlet tube connected to a second end of the body adapted to emit treated exhaust gas;
    a pressure relief device located within the exhaust gas inlet tube upstream of the diesel particulate filter;
    a valve located within the exhaust pipe upstream of the exhaust gas inlet tube, such that the valve can redirect exhaust gas into the exhaust gas inlet tube in response to one of a predetermined temperature condition within a main diesel particulate filter and a pressure condition within the main diesel particulate filter such that no exhaust flow passes to the main diesel particulate filter when the valve is closed; and wherein the pressure relief device is a rupture disk.

9. The safety device of claim 8, wherein the valve is a butterfly valve.

10. The safety device of claim 8, wherein the diesel particulate filter is one of a ceramic diesel particulate filter and a silicon carbide diesel particulate filter.

11. The safety device of claim 8, wherein the ratio of the diameter of the exhaust gas inlet tube to the exhaust pipe is less than 1.0.

12. The safety device of claim 8 further comprising an annunciator such that the annunciator sounds if the valve is closed.

13. An exhaust gas aftertreatment device comprising:
    a first diesel particulate filter having a first exhaust gas inlet connected to an exhaust pipe configured to introduce exhaust gas into the first diesel particulate filter and a first exhaust gas outlet for emitting treated exhaust gas;
    a second diesel particulate filter having a second exhaust gas inlet connected to an exhaust pipe to introduce exhaust gas into the second diesel particulate filter and a second exhaust gas outlet for emitting treated exhaust gas wherein the second exhaust gas inlet further comprises a pressure relief device upstream of the second diesel particulate filter; a valve located within the exhaust pipe upstream of the first diesel particulate filter; a control means for controlling operation of the valve such that the valve is commanded closed and no exhaust flow passes to the first diesel particulate filter when the valve is closed when one or more of a predetermined temperature condition is detected within the first diesel particulate filter, a predetermined pressure condition is detected within the first diesel particulate filter, and a predetermined diagnostic condition is detected; and wherein the pressure relief device is a rupture disk.

14. The exhaust gas aftertreatment device of claim 13, wherein the valve is a butterfly valve.

15. The exhaust gas aftertreatment device of claim 13, wherein the first diesel particulate filter is a metal diesel particulate filter.

16. The exhaust gas aftertreatment device of claim 15, wherein the first diesel particulate filter may be regenerated.

17. The exhaust gas aftertreatment device of claim 13, wherein the second diesel particulate filter is one of a ceramic diesel particulate filter and a silicon carbide diesel particulate filter.

18. The exhaust gas aftertreatment device of claim 13, wherein the ratio of the diameter of the exhaust gas inlet tube to the exhaust pipe is less than 1.0.

19. The exhaust gas aftertreatment device of claim 13 further comprising an annunciator such that the annunciator sounds if the valve is closed.

* * * * *